United States Patent
Beaman et al.

[15] 3,700,698
[45] Oct. 24, 1972

[54] 1,2-EPOXY-3-(3-IODO-2-PROPYNYLOXY)-PROPANE

[72] Inventors: Alden Gamaliel Beaman, North Caldwell, N.J.; Robert Duschinsky, Pully-Lausanne, Switzerland; William Paul Tautz, New York, N.Y.

[73] Assignee: Hoffman-La Roche Inc., Nutley, N.J.

[22] Filed: May 12, 1971

[21] Appl. No.: 142,777

Related U.S. Application Data

[60] Division of Ser. No. 61,516, Aug. 5, 1970, Pat. No. 3,641,047, which is a division of Ser. No. 840,077, April 23, 1969, Pat. No. 3,549,653, which is a division of Ser. No. 556,585, June 10, 1966, Pat. No. 3,468,902, which is a continuation-in-part of Ser. No. 447,087, April 9, 1965, abandoned.

[52] U.S. Cl. ..............................260/348 R
[51] Int. Cl. ..................................C07d 1/18
[58] Field of Search ........................260/348 R

[56] References Cited

UNITED STATES PATENTS 2,986,569   5/1961   Monroe et al..........260/348 R

*Primary Examiner*—Norma S. Milestone

[57] ABSTRACT

The compound 1,2-epoxy-3-(3-iodo-2-propynyloxy)-propane, which is useful in preparing antimicrobial-2-nitroimidazole derivatives.

1 Claim, No Drawings

1,2-EPOXY-3-(3-IODO-2-PROPYNYLOXY)-PROPANE

CROSS REFERENCE TO RELATED APPLICATIONS

This application is a divisional application of Ser. No. 61,516, filed Aug. 5, 1970, now U.S. Pat. No. 3,641,047, issued Feb. 8, 1972, which in turn is a divisional application of Ser. No. 840,077, filed Apr. 23, 1969, now U.S. Pat. No. 3,549,653, which in turn is a divisional application of our application Ser. No. 556,585, filed June 10, 1966, now U.S. Pat. No. 3,468,902, Sept. 23, 1969, which is a continuation-in-part of our application Ser. No. 447,087, filed Apr. 9, 1965, now abandoned.

DETAILED DESCRIPTION OF THE INVENTION

The present invention relates to 1-substituted nitroimidazoles and, more particularly, relates to 1-substituted-2-nitroimidazoles of the formula

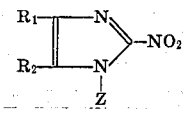

I wherein $R_1$ and $R_2$ are each independently selected from the group consisting of hydrogen and lower alkyl; Z represents one of the following groups:

(a)  $-CH_2-CH\underset{O}{\overset{}{\diagdown\!\!\diagup}}CH_2$ (b)  $-CH_2-CH-CH_2-R_3$
              $|$
              $OH$ (c)  $-CH_2-C-CH_2-R_3$
              $|$
              $O-Acyl$ (d)  $-CH_2-C-CH_2-R_3$
              $\|$
              $O$ (e)  $-CH_2-C-CH_2-R_3$
              $\|$
              $N-NHCONH_2$ $R_3$ is hydrogen, halogen, hydroxyl, lower alkoxy, lower alkenyloxy, lower alkynyloxy, halo-lower alkoxy, poly-halo-lower alkoxy, halo-lower alkynyloxy, phenoxy or phenoxy in which one or more of the hydrogen has been replaced by halogen, lower alkyl or lower alkoxy; and "Acyl" represents lower alkanoyl, benzoyl or benzoyl in which one or more of the hydrogens has been replaced by halogen, lower alkyl or lower alkoxy
and pharmaceutically acceptable salts thereof.

In one of its specific aspects the invention relates to compounds of the formula

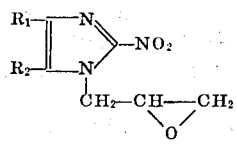

II wherein $R_1$ and $R_2$ have the same meaning as above
and pharmaceutically acceptable salts thereof.

In another specific aspect the invention relates to compounds of the formula

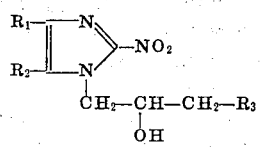

III wherein $R_1$, $R_2$ and $R_3$ have the same meaning as above
and pharmaceutically acceptable salts thereof.

In another specific aspect the invention relates to compounds of the formula

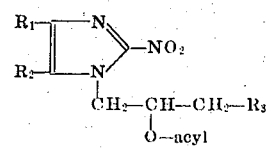

IV wherein $R_1$, $R_2$, $R_3$ and Acyl have the same meaning as above
and pharmaceutically acceptable salts thereof.

In still another specific aspect the invention relates to compounds of the formula

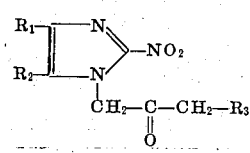

V wherein $R_1$, $R_2$ and $R_3$ have the same meaning as above
and pharmaceutically acceptable salts thereof.

In yet another specific aspect the invention relates to compounds of the formula

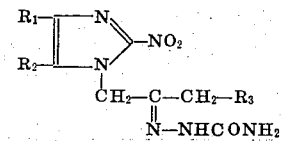

VI wherein $R_1$, $R_2$ and $R_3$ have the same meaning as above
and pharmaceutically acceptable salts thereof.

As used throughout this application the terms "halo," "halogen" and the like denote all four halogens, i.e., bromine, chlorine, iodine and fluorine. The term "lower alkyl" denotes saturated aliphatic hydrocarbons containing one to seven carbon atoms both straight and branched chain, e.g., methyl, ethyl, propyl, isopropyl, butyl, isobutyl, t-butyl and the like. The term "lower alkoxy" denotes lower alkyl ether groups wherein the lower alkyl portion is as defined above. The term "lower alkenyloxy" denotes an unsaturated aliphatic hydrocarbon ether group preferably containing only one double bond such as vinyloxy, allyloxy, 1,2-butenyloxy, 2,3-butenyloxy and the like. The term "lower alkynyloxy" denotes unsaturated aliphatic hydrocarbon ether groups containing at least one triple bond such as ethinyloxy, propynyloxy, butynyloxy and the like. The term "acyl" denotes the acid residue of an organic acid preferably a lower alkanoic acid, e.g., acetic acid, propionic acid, butenoic acid and like, or benzoic acid of a kenzoic acid derivative such as halo-benzoic acid, toluic acid, p-methoxybenzoic acid and the like.

Compounds of formula III are prepared by reacting 2-nitroimidazole with 1,2-propylene oxide or an appropriately substituted oxirane derivative, i.e., 3-$R_3$-1,2-propylene oxide wherein $R_3$ has the same meaning as above. As exemplary oxirane derivatives suitable for use in this reaction, there can be named the following:

1,2-epoxy-3-halo-propane
1,2-epoxy-3-hydroxy-propane 1,2-epoxy-3-lower alkoxy-propanes, e.g., 1,2-epoxy-3-methoxy-propane, 1,2-epoxy-3-ethoxy-propane, 1,2-epoxy-3-propoxy-propane, etc.

1,2-epoxy-3-lower alkenyloxy-propanes, e.g., 1,2-epoxy-3-vinyloxy-propane, 1,2-epoxy-3-allyloxy propane, 1,2-epoxy-3-butenyl-propane, etc.

1,2-epoxy-3-(halogeno-lower alkoxy)propanes, e.g., 1,2-epoxy-3-chloromethoxy-propane, 1,2-epoxy-3-($\beta$-chloroethoxy)propane, 1,2-epoxy-3-trifluoromethoxy propane, 1,2-epoxy-3-($\beta,\beta,\beta$-trifluoroethoxy)propane, 1,2-epoxy-3-(C:$a$-chloro-$\beta$-chloroethoxy)propane, etc.

1,2-epoxy-3-(halogeno-lower alkynyloxy)propanes, e.g.,
   1,2-epoxy-3-(3-iodo-2-propynyloxy)propane, etc.
   1,2-epoxy-3-phenoxy-propane
   1,2-epoxy-3-(halo-phenoxy)propane
   1,2-epoxy-3-(lower alkylphenoxy)propane
   1,2-epoxy-3-(lower alkoxyphenoxy)propane
and the like.

The reaction with epihalohydrins or with other appropriately substituted oxirane derivatives to form compounds of formula III can be suitably carried out at an elevated temperature preferably a temperature in the range of about 50° C. to about 150° C. and preferably in the presence of an acid neutralizing agent such as an alkali metal hydroxide, e.g., sodium hydroxide, potassium hydroxide, etc., an alkali metal carbonate, e.g., sodium or potassium carbonate, an amine such as ammonia, or the like, or, if desired, in the absence of an acid neutralizing agent. The oxirane may serve as a solvent, or an alcohol such as ethanol may also be employed as solvent. Water may also be used as solvent.

Certain of the compounds of formula III can also be prepared by alternative processes. Thus, for example, the diols of formula III, i.e., compounds of formula III wherein $R_3$ is hydroxyl, can be prepared from the corresponding epoxides of formula II by treatment with a suitable acid such as sulfuric acid, hydrofluoric acid and the like. The epoxides of formula II are in turn prepared by treating the compounds of formula III where $R_3$ is halogen with base, e.g., sodium hydroxide and the like. Compounds of formula III wherein $R_3$ is bromo or chloro can also be prepared from the epoxide of formula II by treating with the appropriate hydrohalic acid.

The compounds of formula IV are prepared by forming an ester of a compound of formula III by treating with any of the conventional acylating agents such as lower alkanoic acid, benzoic acid, substituted benzoic acid, benzene sulfonic acid, p-toluene sulfonic acid and ester-forming derivatives thereof such as the corresponding anhydrides or acid halides, e.g., acid chlorides. Compounds of formula V, namely the 1-(2-nitro-1-imidazolyl)-3-$R_3$-propan-2-ones are prepared by reacting a compound of formula III in a ketone solvent such as acetone in the presence of a chromate solution. The reaction is preferably carried out at about room temperature through higher or lower temperatures, e.g., temperatures in the range of about 0° to 100° C., could also be used. Compounds of formula V wherein $R_3$ is hydrogen are also prepared by reacting the appropriate 2-nitroimidazole derivative with a halo acetone, e.g., chloro acetone, in the presence of an alkali metal lower alkoxide, e.g., sodium methoxide, potassium ethoxide and the like, preferably in the presence of an inert organic solvent, e.g., N,N-dimethylformamide, N,N-dimethylacetamide, dimethylsulfoxide and the like.

Compounds of formula VI are prepared from compounds of formula V by reacting with semicarbazide or a suitable salt thereof in the presence of an alkali metal acetate, e.g., sodium acetate trihydrate. The reaction is suitably carried out in an inert organic solvent such as a lower alkanol, e.g., methanol, ethanol and the like, and is preferably carried out at an elevated temperature between about room temperature and the boiling point of the reaction mixture.

The compounds of formula I and their acid addition salts with pharmaceutically acceptable acids are useful as anti-microbial agents. They are particularly useful against bacteria, fungi, pathogenic yeasts and protazoa, for example, against *Trichomonas vaginalis*, *Trichomonas foetus*, *Histomonas malegradis*, *Endamoeba histolytica*, *Trypanosomes*, e.g., *T. cruzi*, *T. rhodesieuse*, *T. cougoleuse*, and the like, and can, therefore, be used as germicides, anti-protozoal agents, e.g., trichomonoacides, histomonacides, trypanacides, and agents for the treatment of pathogenic yeast infections.

Compounds of formula III are particularly well suited for the treatment of protozoal infections, e.g., trichomoniasis and histomoniasis and those compounds of formula III wherein R is hydrogen, hydroxy, halo, i.e., chloro, bromo, fluoro or iodo, alkoxy, especially methoxy, and haloalkoxy, constitute a preferred group.

For use in the treatment of infectious diseases such as Trichomoniasis, Trypanosomiasis, Histomoniasis, etc., the compounds of this invention can be administered orally, parenterally or topically. They can be formulated into conventional pharmaceutical dosage forms in admixture with organic or inorganic inert carrier materials which are suitable for enteral, parenteral or topical application such as, for example, water, gelatin, lactose, starch, magnesium stearate, talc, vegetable oil, gum arabic, polyalkylene glycols, Vaseline, etc. or other conventional excipients. They can be prepared in the form of tablets, dragees, suppositories, capsules, ointments, creams, etc., or in liquid form such as solutions, suspensions emulsions and the like. They can contain other additives such as preserving, stabilizing, wetting or emulsifying agents, salts for varying the osmotic pressure, buffers and the like or they can be formulated with other therapeutically useful materials. Typically oral dosages of the novel compounds of this invention and their salts range from about 10 to about 100 mg/kg animal body weight though higher or lower dosages adjusted to species and individual requirements may also be used.

Acid addition salts of the novel compounds of this invention, i.e., the compounds of formula I, are prepared by reacting with inorganic acids such as hydrochloric acid, hydrobromic acid, sulfuric acid, etc., or with organic acids such as oxalic acid, acetic acid, lactic acid, tartaric acid and the like. Non-pharmaceutically acceptable acid addition salts can be converted into pharmaceutically acceptable acid addition salts by neutralization followed by reaction with a suitable pharmaceutically acceptable acid.

The novel products of this invention and their use will be more fully understood from the examples which follow. These examples are intended to illustrate the invention and are not to be construed as limitative thereof.

EXAMPLE 1

Preparation of 1-(2-nitro-1-imidazolyl)-3-chloro-2-propanol

A mixture of 52.3 g. (462 mmoles) of powdered sublimed 2-nitroimidazole, 315 ml. of epichlorohydrin and 5.25 g. of anhydrous potassium carbonate was stirred and heated. When boiling commenced the heating mantle was shut off, but left in place and the reaction mixture was boiled briskly for 10 minutes. The hot mixture was filtered and the insoluble material was washed with boiling ethanol. From the refrigerated filtrate crude product was obtained. This was recrystallized from 1100 ml. of boiling ethanol to give 1-(2-nitro-1-imidazolyl)-3-chloro-2-propanol as yellow crystals, melting point 156°–158°. $\lambda_{max.}^{EtOH}$ 315 m$\mu$, $\epsilon = 7,800$.

EXAMPLE 2

Preparation of 1-(2,3-epoxypropyl)-2-nitroimidazole 250 ml. of 10 per cent aqueous sodium hydroxide solution was stirred at room temperature and 38.13 g. (185 mmoles) of finely powdered 1-(2-nitro-1-imidazolyl)-3-chloro-2-propanol was added and beaten into suspension. In 1 or 2 minutes, the solid dissolved and in 2 or 3 minutes a new, crystalline solid began to form. The slurry was stirred at room temperature for 5 to 15 minutes and was then cooled in a dry ice bath until it began to freeze. The mixture was filtered and the solid was washed with 40 ml. of ice cold distilled water, slurried in 50 ml. of ice cold distilled water, refiltered, washed with two times 40 ml. of ice cold distilled water and dried. The pale yellow crystalline solid melted at 53°–55°. It was dissolved in 250 ml. of distilled water at 60°, the solution treated with charcoal, and the filtrate refrigerated to give nearly colorless crystals of 1-(2,3-epoxypropyl)-2-nitroimidazole, melting point 53.5°–55°. $\lambda_{max.}^{EtOH}$ 310 m$\mu$, $\epsilon=7,800$.

EXAMPLE 3

Preparation of 1-(2-nitro-1-imidazolyl)-3-bromo-2-propanol

A mixture of 5.00 g. (29.6 mmoles) of 1-(2,3-epoxypropyl)-2-nitroimidazole and 30 ml. of 47 per cent hydrobromic acid was stirred and heated at 80°–90° for 15 minutes. The mixture was cooled and neutralized at a temperature below 0° by the slow addition of 14 ml. of concentrated aqueous ammonia with stirring. The solid which formed was filtered and washed with five 5 ml. portions of distilled water and dried. It was recrystallized from 80 ml. of absolute ethanol to give 1-(2-nitro-1-imidazolyl)-3-bromo-2-propanol as pale yellow crystals, melting point 149°–150° $\lambda_{max.}^{EtOH}$ 314 m$\mu$, $\epsilon=6900$.

EXAMPLE 4

Preparation of 1-(2-nitro-1-imidazolyl)-2-propanol

A mixture of 5.00 g. (44.2 mmoles) of powdered sublimed 2-nitroimidazole, 0.60 g. (4.3 mmoles) of anhydrous potassium carbonate and about 75–100 ml. of propylene oxide was heated at 90°–113° for 2-3/4 hours in a rocking autoclave under 700 pounds of nitrogen pressure. The 2-nitroimidazole had dissolved and the product remained in solution at room temperature. The $K_2CO_3$ was filtered and the propylene oxide removed in vacuo to give an amber oil which gradually partially solidified on cooling. This was slurried in 20 ml. of benzene at room temperature, filtered and washed with 10 ml. of benzene. The crude solid was recrystallized from 20 ml. of boiling absolute ethanol to give pale yellow chunky crystals of 1-(2-nitro-1-imidazolyl)-2-propanol, melting point 119.5°–121°. $\lambda_{max.}^{EtOH}$ 315 m$\mu$, $\epsilon=7,600$.

EXAMPLE 5

Preparation of 1-(2-nitro-1-imidazolyl)-3-methoxy-2-propanol

A mixture of 8.23 g. (72.7 mmoles) of powdered, sublimed 2-nitroimidazole, 0.84 g. (6.1 mmoles) of anhydrous potassium carbonate, and 49 ml. of 1,2-epoxy-3-methoxypropane was stirred and boiled (109°–114°) for 8 minutes and filtered hot and the $K_2CO_3$ was washed with hot absolute ethanol. The filtrate plus wash was evaporated to a moist solid in vacuo (0.3 mm. Hg., bath 30°–40°). This solid was slurried in 40 ml. of absolute ethanol, filtered, and washed with two 5 ml. portions of ethanol. It was recrystallized from 100 ml. of absolute ethanol to give off-white crystals of 1-(2-nitro-1-imidazolyl)-3-methoxy-2-propanol, melting point 110°–111°. $\lambda_{max.}^{EtOH}$ 314 m$\mu$ $\epsilon=7,400$.

EXAMPLE 6

Preparation of 1-(2-nitro-1-imidazolyl)-3-methoxy-2-propanol

A mixture of 30.0 g. of ground and sieved sublimed 2-nitroimidazole, 3.00 g. of anhydrous potassium carbonate, 48.5 ml. (47.3 g.) of 1,2-epoxy-3-methoxypropane and 225 ml. of absolute ethanol was refluxed with stirring. After solution had become clear except for $K_2CO_3$ and a bit of haze (about 30–45 min.), the refluxing was continued for an additional 30 minutes. The reaction mixture was filtered hot, washing with a little hot absolute ethanol. The filtrate was refrigerated overnight. The chunky amber crystals were filtered, washed with 25 ml. of ethanol and dried. The crude product was recrystallized from 340 ml. of boiling ethanol (Norit A) and the filtrate refrigerated overnight to give 1-(2-nitro-1-imidazolyl)-3-methoxy-2-propanol as light yellow crystals, m.p. 110°–111°. $\lambda_{max.}^{EtOH}$ 314 m$\mu$, $\epsilon=7,400$.

EXAMPLE 7

Preparation of 1-(2-nitro-1-imidazolyl)-2-propanone

A slurry of 10.44 g. (92.4 mmoles) of sublimed 2-nitroimidazole in 100 ml. of N,N-dimethylformamide was dissolved to a red solution by the addition of 20.8 ml. of 4.44 N sodium methoxide in methanol solution. Enough 2-nitroimidazole was added to change the color of the solution to yellow. With stirring the solution was heated to 153° to remove the methanol and cooled to 60°. With stirring 10 ml. (11.5 g.) of chloroacetone was added. The temperature rose spontaneously to 73° over a period of 7 minutes and a precipitate of NaCl formed. The mixture was then heated to 114° over a period of 15 minutes with stirring, and was then cooled. The mixture was evaporated to an oil in vacuo (0.2 mm. Hg., bath 30°–40°). The oil was diluted with 70 ml. of absolute ethanol and the solid which precipitated was filtered, washed with 20 ml. of ethanol and dried. This was boiled with 225 ml. of benzene and filtered from NaCl. From the filtrate on cooling there formed nearly colorless lath-shaped crystals of 1-(2-nitro-1-imidazolyl)-2-propanone, melting point 75°–76°. $\lambda_{max.}^{EtOH}$ 313 m$\mu$, $\epsilon$=7,500.

EXAMPLE 8

Preparation of 3-(2-nitro-1-imidazolyl)-1,2-propanediol

A solution of 8.00 g. (47.2 mmoles) of 1-(2,3-epoxypropyl)-2-nitroimidazole in 48 of 6N sulfuric acid was heated at 60°–65° for 15 minutes with stirring. The solution was cooled and neutralized to pH 7 at a temperature below 0° by the slow addition of 18 ml. of concentrated aqueous ammonia with stirring. The solution was extracted with two 500 ml. portions of ethyl acetate and the solvent removed in vacuo to give a solid which was ground in a mortar with 30 ml. of distilled water at room temperature and filtered from an insoluble impurity. The water was evaporated and the obtained solid was recrystallized from 50 ml. of absolute ethanol (charcoal) to give crystalline 3-(2-nitro-1-imidazolyl)-1,2-propanediol, m.p. 110°–112°. $\lambda_{max.}^{EtOH}$ 314 m$\mu$, $\epsilon$=7,100.

EXAMPLE 9

Preparation of 3-(2-nitro-1-imidazolyl)-1,2-propanediol

A mixture of 40.2 g. (355 mmoles) of powdered and sieved sublimed 2-nitroimidazole, 300 ml. of absolute ethanol, 4.00 g. of anh. K$_2$CO$_3$ and 47 ml. (52.5 g., den 1.12, 710 mmoles) of glycidol was refluxed with stirring until the UV spectrum in 0.1 N NaOH indicated no unreacted 2-nitroimidazole (40 min.). (At this stage the reaction mixture was a clear amber solution.) The EtOH was removed in vacuo to give a dark amber oil which was dissolved in 100 ml. of cold distilled water. The pH of the solution was adjusted to 7 with 8.5 ml. of 2N HCl and the solution was then extracted with 5 times 700 ml. of ethyl acetate. The ethyl acetate extracts were allowed to evaporate in shallow dishes to give a sticky solid. The combined extract was ground in a mortar with 150 ml. of ethanol, filtered, washed with 3 times 10 ml. of ethanol and dried. Recrystallized from 325 ml. of boiling absolute ethanol ~ 5g. Norit A), there was obtained 3-(2-nitro-1-imidazolyl)-1,2-propanediol as pale yellow crystals, m.p. 110°–111°, having an Infrared Spectrum identical to that of the material prepared from 1-(2,3-epoxypropyl)-2-nitroimidazole.

EXAMPLE 10

Preparation of 1-(2-nitro-1-imidazolyl)-3-iodo-2-propanol

Powdered sublimed 2-nitroimidazole (5.20 g.) plus 0.52 g. of anhydrous K$_2$CO$_3$ plus 10 ml. of absolute ethanol plus 9.9 ml. of epiiodohydrin was stirred and refluxed at 84°–120° for 17 minutes. The hot solution was diluted to about 50 ml. with hot ethanol, filtered from K$_2$CO$_3$ and a yellow powder and cooled to give crystalline solid 1-(2-nitro-1-imidazolyl)-3-iodo-2-propanol, melting point 135°–138°. The crude material was recrystallized twice from absolute ethanol to give crystals of melting point 138°–139°. $\lambda_{max.}^{EtOH}$ 317 m$\mu$, $\epsilon$=6,900.

EXAMPLE 11

Preparation of 1-(2-nitro-1-imidazolyl)-3-fluoro-2-propanol

Powdered sublimed 2-nitroimidazole (2.00 g.) plus 0.20 g. of anhydrous K$_2$CO$_3$ plus 5.0 ml. of epifluorohydrin was stirred and refluxed until the solid dissolved except for the K$_2$CO$_3$ (52 minutes). The solution was diluted with 10 ml. of boiling absolute ethanol, filtered and cooled to give crude material which was recrystallized from ethanol to give nearly colorless crystals of 1-(2-nitro-1-imidazolyl)-3-fluoro-2-propanol, melting point 139.5°–140°. $\lambda_{max.}^{EtOH}$ 314 m$\mu$, $\epsilon$=7,500.

EXAMPLE 12

Preparation of 1-(2-nitro-1-imidazolyl)-3-chloro-2-propanolacetate

Powdered 1-(2-nitro-1-imidazolyl)-3-chloro-2-propanol (1.08 g.) plus 10 ml. of acetic anhydride was refluxed for 15 minutes. The acetic anhydride was removed in vacuo (oil pump) and 5 ml. of absolute ethanol was added and removed in vacuo. Then 5–8 ml. of absolute ethanol was added and the solid which formed was collected (melting point 151°–153.5°, presumably starting material). The ethanol was evaporated and the resulting gum was dissolved in 5 ml. of CHCl$_3$, filtered, and 4 ml. of hexane added and the mixture cooled. A tar formed. The supernatant liquid was decanted and 2 ml. of hexane was added. An oil formed. The mixture was heated, filtered, and the light yellow filtrate cooled, yielding an oil. The solvent was decanted and the oil dried (1.3 mm., 80°) for 1 hour. 1-(2-Nitro-1-imidazolyl)-3-chloro-2-propanolacetate was obtained thereby.

EXAMPLE 13

Preparation of 1-(4,5-dimethyl-2-nitro-1-imidazolyl)-3-chloro-2-propanol

Five grams (35.4 mmoles) of 4,5-dimethyl-2-nitroimidazole, 0.50 g. (3.6 mmoles) of anhydrous K$_2$CO$_3$ and 30 ml. of epichlorohydrin was refluxed for 10 minutes. The hot solution was filtered and the insoluble solid was washed with 3 times 5 ml. of boiling ethanol. The solution was evaporated to dryness in vacuo and the solid recrystallized from ethanol to give crystals melting at 162°–163.5°. These were recrystallized from 90 ml. of ethyl acetate to give 1-(4,5-dimethyl-2-nitro-1-imidazolyl)-3-chloro-2-propanol as crystals, m.p. 165.5°–166.5°. $\lambda_{max.}^{0.1N}$ HCl 369 m$\mu$, $\epsilon$=11,900.

EXAMPLE 14

Preparation of 1-(2-nitro-1-imidazolyl)-3-fluoro-2-propanol

A mixture of 22.5 g. (199 mmoles) of powdered and sieved sublimed 2-nitroimidazole, 2.25 g. anhydrous potassium carbonate, 100 ml. of absolute ethanol and 29.1 g. (382 mmoles) of epifluorohydrin was stirred and refluxed. After 47 minutes the solution was completely clear except for chunks of $K_2CO_3$. After 53 minutes reflux the hot solution was filtered. The filtrate was allowed to stand at room temperature for 1 hr. and was then refrigerated for 2 ¼ hours. The crystals which had formed were filtered and washed with 25 ml. of absolute ethanol. They are recrystallized from 230 ml. of ethanol (3.2 g. charcoal) to give pale yellow crystals, m.p. 137.5°–139.5°. A sample was recrystallized again from 10 parts of absolute ethanol to give chunky crystals of 1-(2-nitro-1-imidazolyl)-3-fluoro-2-propanol, m.p. 139.5°–140°. $\lambda_{max.}^{EtOH}$ 314 m$\mu$, $\epsilon$=7,500.

EXAMPLE 15

Preparation of 1-(2-nitro-1-imidazolyl)-3-chloro-2-propanone

Eight grams (39mmoles) of 1-(2-nitro-1-imidazolyl)-3-chloro-2-propanol was dissolved in 200 ml. of boiling reagent acetone and the solution was cooled to 29°. With stirring 10.0 ml. of $CrO_3$ solution (26.7 mmoles equivalent to 40 mmoles of the propanol) was added. (The $CrO_3$ solution used in this preparation contained 266.7 g./1 OF $CrO_3$, MW 100.0 plus 230 ml. concentrated $H_2SO_4/1$. Thus 1 ml. contained 2.67 mmoles $CrO_3$ which is equivalent to 4 mmoles of —CHOH—.) The temperature rose to 36.5° over 15 minutes and then fell. At 20 minutes, 30 minutes and 50 minutes (total reaction times) 3 ⅛ ml. portions of $CrO_3$ solution were added. The reaction mixture was stirred for a total of 1.5 hrs. and 200 ml. of distilled water was added. The solution was cooled to 20°, neutralized to pH 7.0 by the slow addition of 9 ml. of concentrated ammonia solution. The solid which formed was filtered and the filtrate extracted with 700 ml. of ethyl acetate. The ethyl acetate extract was dried and evaporated to an oil at water aspirator vacuum. The oil solidified upon trituration with ether and the solid was collected. It was dissolved in 300 ml. of boiling reagent benzene and the decantate was allowed to stand quietly for about an hour. Hazy material was removed by filtration and from the filtrate crystals of 1-(2-nitro-1-imidazolyl)-3-chloro-2-propanone, m.p. 91.5°–93°, were obtained (standing over weekend). $\lambda_{max.}^{EtOH}$ 313 m$\mu$, $\epsilon$=7,400. UV study in 0.1N NaOH indicates the material is destroyed rapidly by base at room temperature.

EXAMPLE 16

Preparation of 1-(2-nitro-1-imidazolyl)-3-(2-chloroethoxy)-2-propanol

A mixture of 50.0 g. (442 mmoles) of powdered and sieved sublimed 2-nitroimidazole, 5.00 g. of anhydrous potassium carbonate, 420 ml. of absolute ethanol and 101 ml. (121 g., 884 mmoles) of 1,2-epoxy-3-(2'-chloroethoxy)propane was stirred and refluxed. After 50 minutes the solution was clear except for potassium carbonate and a bit of haze, and after an additional 20 to 30 minutes reflux the solution was filtered hot and the filtrate was refrigerated overnight. The crystals which formed were filtered, washed with 75 ml. of absolute ethanol, dried and recrystallized from 700 ml. of boiling absolute ethanol (25 g. charcoal) to give fine, nearly colorless crystals of 1-(2-nitro-1-imidazolyl)-3-(2-chloroethoxy)-2-propanol, melting point 95.5°–96.5°. $\lambda_{max.}^{EtOH}$ 314 m$\mu$, $\epsilon$=7,200.

EXAMPLE 17

Preparation of 1-(2-nitro-1-imidazolyl)-3-chloro-2-propanol anisate

Anisoyl chloride (3.0 g., 17.6 mmoles) was dissolved in 60 ml. of anhydrous pyridine (distilled from BaO) and the solution was cooled to 5°. Then 3.0 g. (14.6 mmoles) of 1-(2-nitro-1-imidazolyl)-3-chloro-2-propanol was added (dissolved readily). The solution was allowed to stand in an ice bath for 2 hrs. and was then allowed to warm to room temperature (5.5 hrs.). The solution was evaporated to an oil in vacuo. This was shaken thoroughly with a mixture of 30 ml. of ethyl acetate plus 30 ml. of saturated aqueous sodium carbonate. The organic layer was separated and extracted in turn with 2 × 30 ml. of saturated $Na_2CO_3$ solution, 3 × 30 ml. of 1N HCl and 3 × 30 ml. of distilled water. The EtOAc layer was dried over anhydrous $MgSO_4$ and concentrated to an oil in vacuo. This was dissolved in 10–15 ml. of benzene. Crystals, m.p. 97.5°–101°, formed upon standing over the weekend. These were crystallized twice more from absolute ethanol to give 1-(2-nitro-1-imidazolyl)-3-chloro-2-propanol anisate as crystals, m.p. 106°–107.5°. 258, 312 m$\mu$, $\beta$=19,800; 7,500.

EXAMPLE 18

Preparation of 1-(2-nitro-1-imidazolyl)3-ethoxy-2-propanol

A mixture of 15.1 g. (133 mmoles) of powdered and sieved sublimed 2-nitroimidazole, 1.51 g. anhydrous potassium carbonate, 75 ml. of absolute ethanol and 30 ml. (28.8 g., 282 mmoles) of 1,2-epoxy-3-ethoxypropane was stirred and refluxed for 1.75 hr The mixture was filtered and the filtrate evaporated to a light amber colored oil in vacuo (0.2 mm bath 45°). The oil was slurried in 25 ml. of ethanol at room temperature, filtered and the filtrate allowed to evaporate in a petri dish to give an oil which gradually crystallized. The oil was allowed to stand one week to permit reasonably complete crystallization. The crystals, wet with an amber oily material, were mixed thoroughly with about 6 ml. of room temperature absolute ethanol and filtered. This removed much of the amber oil. The solid was dried and dissolved in 110 ml. of boiling benzene, filtered and the filtrate cooled near the freezing point of benzene. The flakelet crystals which formed were collected, washed with 10 ml. of benzene and dried, m.p. 52.5°–54.5°. This was dissolved in 18 ml. of hot ethanol and the solution cooled in the freezer overnight to give needles of 1-(2-nitro-1-imidazolyl)-3-ethoxy-2-propanol which were collected, washed with 2 ml. of cold (freezer) absolute ethanol and dried, m.p. 58°–59°. $\lambda_{max.}^{EtOH}$ 317 m$\mu$, $\epsilon$=7,200.

EXAMPLE 19

Preparation of 1-(2-nitro-1-imidazolyl)-3-phenoxy-2-propanol

A mixture of 5.07 g. (44 mmoles) of powdered and sieved sublimed 2-nitroimidazole, 0.51 g. of anhydrous potassium carbonate, 10.0 ml. (11.0 g., 73 mmoles) of 1,2-epoxy-3-phenoxypropane and 50 ml. of absolute ethanol was stirred and refluxed. After 1 hr. 20 minutes reflux the solution was clear except for $K_2CO_3$. After 15 minutes more reflux the solution was filtered and the filtrate refrigerated. The solid which formed was collected, washed with 2 × 10 ml. of absolute ethanol (removes most of the color) and dried. This was recrystallized from 100 ml. of boiling absolute ethanol (charcoal) to give 1-(2-nitro-1-imidazolyl)-3-phenoxy-2-propanol as crystals, m.p. 142.5°–143.5°. $\lambda_{max.}^{EtOH}$ 269, 276, 314 m$\mu$, $\epsilon$ = 3,600, 3,900, 7,200.

EXAMPLE 20

Preparation of 1-(2-nitro-1-imidazolyl)-3-(2,4-dichlorophenoxy)-2-propanol

A mixture of 10.0 g. (88.4 mmoles) of ground and sieved sublimed 2-nitroimidazole, 100 ml. of absolute ethanol, 1.00 g. anhydrous $K_2CO_3$ and 26.2 ml. (35.9 g., 164 mmoles, den. 1.37) of 1,2-epoxy-3-(2,4-dichlorophenoxy)propane was refluxed with stirring until the UV spectrum of the reaction mixture in 0.1 N NaOH showed a maximum at 328 m$\mu$ and no sign of a shoulder near 370 m$\mu$. The hot mixture was filtered, the insoluble solid washed with hot ethanol and dried. The filtrate was refrigerated to give additional product. The total product was recrystallized from 700 ml. of boiling absolute ethanol (charcoal) to give 1-(2-nitro-1-imidazolyl)-3-(2,4-dichlorophenoxy)-2-propanol as crystals, m.p. 160°–162°. $\lambda_{max.}^{EtOH}$ 292, 313 m$\mu$, $\epsilon$=7,700, 8,000.

EXAMPLE 21

Preparation of 1-(2-nitro-1-imidazolyl)-3-methoxy-2-propanone

To a stirred solution of 12.25 g. (61.0 mmoles) of 1-(2-nitro-1-imidazolyl)-3-methoxy-2-propanol in 300 ml. of reagent grade acetone at 21° was added 15 ml. of $CrO_3$ solution. (This solution contained 266.7 g. $CrO_3$, m.w. 100.0, plus 230 ml. of concentrated $H_2SO_4$ diluted to 1 l. with $H_2O$; thus, 1 ml. contained 2.67 mmoles of $CrO_3$ which is equivalent to 4.0 mmoles of -CHOH-.) The temperature rose to 35° over a period of 10 minutes and then fell. Then at 20 minutes and 35 minutes (total reaction times) 5 ml. portions of $CrO_3$ solution were added. The reaction mixture was stirred for a total of one hour, cooled in an ice bath and 300 ml. of distilled water was added. The solution was cooled to 18° and neutralized to pH 5 by the dropwise addition of 8 ml. of concentrated aqueous ammonia solution with stirring. The hazy solution was filtered and the filtrate extracted with 1,200 ml. of ethyl acetate. The organic layer was dried over Drierite, filtered and the filtrate evaporated in vacuo to give an oil. 60 ml. of ether was added and the oil soon solidified. The solid was ground in a mortar with the ether, filtered and recrystallized from 100 ml. of boiling benzene to give 1-(2-nitro-1-imidazolyl)-3-methoxy-2-propanone as crystals, m.p. 65°–66°. $\lambda_{max.}^{EtOH}$ 315 m$\mu$, $\epsilon$ = 7,300. The compound was unstable in solution in 0.1 N NaOH, the UV absorption being rapidly lost.

EXAMPLE 22

Preparation of 1-(2-nitro-1-imidazolyl)-3-(2-chloroethoxy)-2-propanone

To a stirred solution of 10.16 g. (40.7 mmoles) of 1-(2-nitro-1-imidazolyl)-3-(2-chloroethoxy)-2-propanol in 250 ml. of reagent grade acetone at 20° was added 10 ml. of $CrO_3$ solution. (This solution contained 266.7 g. $CrO_3$, m.w. 100.0, plus 230 ml. of concentrated $H_2SO_4$ diluted to 1 l. with $H_2O$; thus, 1 ml. contained 2.67 mmoles of $CrO_3$ which is equivalent to 4.0 mmoles of -CHOH-.) the temperature rose to 32° over a period of 8 minutes. Then at 17 minutes and 46 minutes (total reaction times) 3 ⅛ ml. portions of $CrO_3$ solution were added. The reaction mixture was stirred for a total of 1 ¼ hr., cooled in an ice bath and 250 ml. of distilled water was added. The solution was cooled to 9° and neutralized to pH 5 by the dropwise addition of 5 ml. of concentrated aqueous ammonia solution with stirring. The hazy solution was filtered and the filtrate extracted with 1 l. of ethyl acetate. The organic layer was dried over Drierite, filtered and the filtrate evaporated to an oil in vacuo. Fifty ml. of ether was added and the oil soon solidified. The solid was ground in a mortar with the ether, filtered and recrystallized twice from 90 ml. of boiling benzene to give crystalline 1-(2-nitro-1-imidazolyl)-3-(2-chloroethoxy)-2-propanone, m.p. 69.5°–71°. $\lambda_{max.}^{EtOH}$ 315 m$\mu$, $\epsilon$=7,300.

EXAMPLE 23

Preparation of 1-(2-nitro-1-imidazolyl)-3-(2-chlorophenoxy)-2-propanol

A mixture of 10.0 g. (88.4 mmoles) of ground and sieved sublimed 2-nitroimidazole, 100 ml. of absolute ethanol, 26.6 ml. (32.6 g., 176.8 mmoles, den. 1.22) of 1,2-epoxy-3-(2-chlorophenoxy) propane and 1.00 g. of anhydrous $K_2CO_3$ was refluxed with stirring until the solution became clear except for $K_2CO_3$ (45 minutes) and then for an additional 15 minutes. The hot reaction mixture was filtered and the filtrate was refrigerated overnight to give a light colored product. This was crystallized from 300 ml. of boiling ethanol (charcoal) to give 1-(2-nitro-1-imidazolyl)-3-(2-chlorophenoxy)-2-propanol as crystals, m.p. 130°–132°. $\lambda_{max.}^{EtOH}$ 281, 313 m$\mu$, $\epsilon$ = 4600, 6,800.

EXAMPLE 24

Preparation of 1-(2-nitro-1-imidazolyl)-3-isopropoxy-2-propanol

A mixture of 10.0 g. (88.4 mmoles) of ground and sieved sublimed 2-nitroimidazole, 1.0 g. of anhydrous $K_2CO_3$, 100 ml. of absolute ethanol and 22.5 ml. (20.6 g., 176.8 mmoles, den. 0.912) of 1,2-epoxy-3-isopropoxy-propane was refluxed with stirring until $\lambda_{max.}^{0.1\ N\ NaOH}$= 330 m$\mu$ and there was no shoulder at 370 m$\mu$ (about 2 hours). The hot solution was filtered and the filtrate allowed to evaporate in a shallow dish to give an oil which solidified upon trituration of ether. The solid was filtered, washed with ether and recrystallized from 32 ml. of boiling ethanol (charcoal) to give crystalline 1-(2-nitro-1-imidazolyl)-3-isopropoxy-2-propanol, m.p. 63°–65°. $\lambda_{max.}^{EtOH}$ 314 m$\mu$, $\epsilon$=6,700.

EXAMPLE 25

Preparation of 1-(2-nitro-1-imidazolyl)-3-propoxy-2-propanol

A mixture of 10.0 g. (88.4 mmoles) of ground and sieved sublimed 2-nitroimidazole, 1.0 g. of anhydrous $K_2CO_3$, 100 ml. of absolute ethanol and 22.5 ml. (21.47 g., 185 mmoles, den 0.955) of 1,2-epoxy-3-propoxypropane was refluxed with stirring for 1.5 hrs. (UV curve shows $\lambda_{max.}^{0.1\ N\ NaOH}$ ~332 m$\mu$ and only slight inflection ~372 m$\mu$.) The hot solution was filtered and the filtrate placed in the freezer over the weekend. The clear supernatant liquid was decanted from a little solid (m.p. 220–225 dec.) and the decantate was allowed to evaporate in a shallow dish. The resulting moist solid was mixed thoroughly with 6–7 ml. room temperature absolute ethanol, filtered, washed with 3 ml. absolute EtOH and dried. The crude product was a mixture which was fractionated by repeated crystallizations from benzene, ethanol and water to give a less soluble material as flakelets, m.p. 130.5°–134.5° and a more soluble crystalline material, m.p. 74.5°–76°. $\lambda_{max.}^{EtOH}$ 313 m$\mu$, $\epsilon$ = 6,600. The material, m.p. 74.5°–76°, was the desired 1-(2-nitro-1-imidazolyl)-3-propoxy-2-propanol.

EXAMPLE 26

Preparation of 1-(2-nitro-1-imidazolyl)-2-propanone semicarbazone 1-(2-Nitro-1-imidazolyl)-2-propanone (9.05 g., 53.5 mmoles) was dissolved in 90 ml. of warm ethanol and 90 ml. of distilled water was added. Then 9.05 g. of semicarbazide hydrochloride was added (stirred until dissolved) and then 13.6 g. of sodium acetate trihydrate was added (stirred until dissolved). The solution was heated. At 45° crystals began to form. The mixture was stirred near the boil for 15 minutes and was then refrigerated. The needles which formed were collected, washed with 1:1vol.:vol. H$_2$O:EtOH and dried, m.p. 222°–223° dec. A small sample was recrystallized from 150 volumes of boiling ethanol to give 1-(2-nitro-1-imidazolyl)-2-propanone semicarbazone as fine crystals, m.p. 224°–225° dec. $\lambda_{max.}^{EtOH}$ 310 m$\mu$, $\epsilon$ = 4,500.

EXAMPLE 27

Preparation of 1-(2-nitro-1-imidazolyl)-3-methoxy-2-propanol anisate

A solution of 9.00 g. (52.8 mmoles) of anisoyl chloride in 180 ml. of reagent pyridine (distilled and dried over BaO) was cooled to 5° in an ice bath. Then 9.00 g. (44.7 mmoles) of 1(2-nitro-1-imidazolyl)-3-methoxy-2-propanol was added and the solution was allowed to stand in the ice bath for 1.5 hrs. The solution was evaporated in vacuo to an oil plus solids. This was dissolved in a mixture of 100 ml. of ethyl acetate plug 50 ml. of 1N HCl. The layers were separated and the ethyl acetate layer was extracted in turn with 2 × 25 ml. of 1N HCl, 1 × 25 ml. saturated Na$_2$CO$_3$ solution and 3 × 25 ml. of water. The EtOAc layer was dried over anhydrous Na$_2$SO$_4$ and concentrated in vacuo to an amber oil. This was triturated with ether (30 ml.) and seeded. The crystals which formed were filtered, washed thoroughly with ether and dried, m.p. 72°–73.5°. This was recrystallized from 50 ml. of methanol (1 g. Norit A) to give 1-(2 -nitro-1-imidazolyl)-3-methoxy-2-propanol anisate as crystals, m.p. 73°–75°. $\lambda_{max.}^{iPrOH}$ 258, 313 m$\mu$, $\epsilon$ = 19,300, 7,200.

EXAMPLE 28

Preparation of 1-(2-nitro-1-imidazolyl)-3-methoxy-2-propanone semicarbazone

To a solution of 0.40 g. (2.01 mmoles) of 1-(2-nitro-1-imidazolyl)-3-methoxy-2-propanone in 5 ml. of ethanol was added 5 ml. of water. Then 0.40 g. of semicarbazide hydrochloride was added (stirred until dissolved) followed by 0.60 g. of sodium acetate trihydrate (stirred until dissolved). The solution was heated near the boil for 15 minutes (no solid formed) and was placed in the freezer overnight. The solid which formed was filtered and washed with 3 ml. and then 2 ml. of 1:1 vol.:vol. EtOH:H$_2$O and dried, m.p. 181°–183° dec. It was recrystallized from 35 ml. of boiling ethanol to give shiny flakelets of 1-(2-nitro-1-imidazolyl)-3-methoxy-2-propanone semicarbazone, m.p. 186°–187° dec. $\lambda_{max.}^{EtOH}$ 314 m$\mu$, $\epsilon$=7,000.

EXAMPLE 29

Preparation of 1-(2-nitro-1-imidazolyl)-3-(2-chloroethoxy)-2-propanone semicarbazone To a solution of 0.90 g. (3.6 mmoles) of 1-(2-nitro-1-imidazolyl)-3-(2-chloroethoxy)-2-propanone in 10 ml. of ethanol was added 10 ml. of water. Then 0.90 g. of semicarbazide hydrochloride was added (stirred until dissolved) followed by 1.35 g. of sodium acetate trihydrate (stirred until dissolved). The solution was heated near the boil for 20 minutes (no solid formed) and was refrigerated overnight to give an oil. The supernatant liquid was decanted away and the oil was washed by decantation with two times 1.5 ml. of 1:1 vol.:vol. EtOH:H$_2$O and soon thereafter the oil solidified. It was ground in 3 ml. of ethanol, filtered, washed with 1–2 ml. of ethanol and dried, m.p. 153 ¾°–154 ½°. It was recrystallized from 20 ml. of boiling absolute ethanol to give 1-(2-nitro-1-imidazolyl)-3-(2-chloroethoxy)-2-propanone semicarbazone as colorless fine needles, m.p. 156 ½°–157°. $\lambda_{max.}^{EtOH}$ 316 m$\mu$, $\epsilon$ = 7,000.

EXAMPLE 30

Preparation of 1-(2-nitro-1-imidazolyl)-3-allyloxy-2-propanol

A mixture of 10.0 g. (88.4 mmoles) of ground and sieved sublimed 2-nitroimidazole, 1.00 g. of anhydrous K$_2$CO$_3$, 100 ml. of absolute ethanol and 21.5 ml. (den. 0.975, 20.95 g., 184 mmoles) of 1,2-epoxy-3-allyloxypropane was stirred and refluxed for 1.5 hrs. during which time the solution became essentially clear except for K$_2$CO$_3$. The solution was filtered and the filtrate allowed to evaporate in a shallow dish to give an oil which gradually set to a moist crystalline solid. This was ground in a mortar with a mixture of 15 ml. of ether plus 4 ml. benzene, filtered and washed with 5 ml. of 5 per cent EtOH 95 per cent benzene mixture and dried. It was recrystallized from 15 ml. benzene plus 0.75 ml. absolute ethanol (5 per cent ethanol 95 per cent benzene) and refrigerated to give crystals. (Washing the crystals with the 5 per cent ethanol 95 per cent benzene mixture at room temperature removed some amber oil from the crystals.) These were recrystallized from 10 ml. benzene + 0.5 ml. absolute ethanol to give 1-(2-nitro-1-imidazolyl)-3-allyloxy-2-propanol as crystals, m.p. 57.5°–58.5°. $\lambda_{max.}^{EtOH}$ 318 m$\mu$, $\epsilon$=5,500.

EXAMPLE 31

Preparation of 1-(2-nitro-1-imidazolyl)-3-(2,3-dibromopropoxy)-2-propanol

To a solution of 1.00 g. (4.40 mmoles) of 1-(2-nitro-1-imidazolyl)-3-allyloxy-2-propanol in 10 ml. of CHCl₃ was added a solution of 0.30 ml. (den. 2.93, 0.88 g., 5.5 mmoles) of bromine in 5.5 ml. CHCl₃ at room temperature dropwise with stirring as long as the bromine bleached rapidly. About 4.5 ml. (4.5 mmoles bromine) was required. The mixture was allowed to stand for 30 minutes and the hazy solution was filtered and the filtrate was allowed to evaporate in a shallow dish. The residual oil was triturated with ether and allowed to stand overnight. The resulting sticky solid was slurried in a mixture of 5 ml. of benzene plus 5 drops of ether and filtered, washed with benzene and dried, m.p. 60°–72°. This was dissolved in 5 ml. of hot benzene and the solution cooled and the yellow solid which formed was collected, m.p. below 50°. The filtrate was refrigerated overnight to give solid, m.p. 69.5°–72°. This was recrystallized by dissolving in 1 ml. of warm ethanol and adding 1 ml. of warm distilled water and refrigerating. Colorless flakelet crystals of 1-(2-nitro-1-imidazolyl)-3-(2,3-dibromopropoxy)-2-propanol formed, m.p. 71°–73°. $\lambda_{max}^{EtOH}$ 317 m$\mu$, $\epsilon$=8,200.

EXAMPLE 32

Preparation of 1-(2-nitro-1-imidazolyl)-3-(2,2,2-trifluoroethoxy)-2-propanol

A mixture of 10.00 g. (88.5 mmoles) of ground and sieved sublimed 2-nitroimidazole plus 1.10 g. anhydrous K₂CO₃ plus 100 ml. of absolute ethanol plus 23.0 ml. (den. 1.26, 29.1 g., 186 mmoles) of 1,2-epoxy-3-(2,2,2-trifluoroethoxy)propane was stirred magnetically and refluxed for 1 ⅓ hours during which time the solution became clear except for K₂CO₃ and a bit of haze. The hot solution was filtered and the filtrate was allowed to evaporate to dryness in a shallow dish. The hard, moist crust of solid was ground in a mortar with 10 ml. of absolute ethanol, filtered and washed with 2 × 5 ml. of room temperature absolute ethanol and dried, m.p. 93°–98°. This was recrystallized from 150 ml. of boiling absolute ethanol (5 g. charcoal) (cooling in freezer) to give 1-(2-nitro-1-imidazolyl)-3-(2,2,2-trifluoroethoxy)-2-propanol as colorless crystals, m.p. 95°–96.5°. $\lambda_{max}^{iPrOH}$ 315 m$\mu$, $\epsilon$=7,500.

EXAMPLE 33

Preparation of 1-(2-nitro-1-imidazolyl)-3-methoxy-2-propanol

A mixture of 1.00 g. (8.85 mmoles) of sublimed 2-nitroimidazole, 2 ml. of 1,2-epoxy-3-methoxypropane, 0.1 g. of potassium carbonate and 10 ml. of distilled water was refluxed for 20 min. and cooled to give 1-(2-nitro-1-imidazolyl)-3-methoxy-2-propanol as crystals, m.p. 109°–110.5° and having an I.R. spectrum identical to that of the compound prepared using ethanol as the solvent.

Identical results were obtained when the 0.1 g. of potassium carbonate used above was replaced by either 0.05 g. of sodium hydroxide or by 0.1 ml. of concentrated aqueous ammonia solution.

EXAMPLE 34

Preparation of 1-(2-nitro-1-imidazolyl)-3-methoxy-2-propanol acetate

A solution of 9.57 g. (47.6 mmoles) of 1-(2-nitro-1-imidazolyl)-3-methoxy-2-propanol in 90 ml. of dry pyridine was cooled to 5° and 7 ml. of acetyl chloride was added slowly with stirring maintaining the temperature between 5° and 10°. The mixture was allowed to stand in an ice bath for 30 min. and was then let warm to room temperature. The solvent was removed in vacuo (0.3 mm., bath 35°) and the residue was dissolved in a mixture of 200 ml. of ethyl acetate plus 100 ml. of 0.1N HCl. The layers were separated and the ethyl acetate layer was then extracted in turn with 4 times 100 ml. of 0.1N HCl, 2 times 50 ml. of aqueous sodium carbonate solution and 3 times 50 ml. of distilled water. It was then dried over anhydrous sodium sulfate, filtered and the ethyl acetate was removed in vacuo to give an oil which crystallized on cooling and scratching the walls of the vessel. This was recrystallized from 25 ml. of CCl₄ (1g of Norit A) and then twice from 10 parts of ether to give 1-(2-nitro-1-imidazolyl)-3-methoxy-2-propanol acetate as crystals, m.p. 62°–64°. $\lambda_{max}^{0.1N\ NaOH}$ 326 m$\mu$, $\epsilon$=8000.

EXAMPLE 35

Preparation of 1-(4,5-dimethyl-2-nitro-1-imidazolyl)-3-methoxy-2-propanol

A mixture of 2.50 g. (17.7 mmoles) of 4,5-dimethyl-2-nitro-imidazole, 1.88 g. (21.0 mmoles) of 1,2-epoxy-3-methoxypropane, 0.25 g. of potassium carbonate and 25 ml. of water was refluxed for 40 min. Norit A (0.5 g.) was added and the hot solution was filtered. On cooling crystals, m.p. 119.5°–120.5°, formed. These were recrystallized from 10 ml. of ethanol to give 1-(4,5-dimethyl-2-nitro-1-imidazolyl)-3-methoxy-2-proanol as crystals, m.p. 120°–121°. $\lambda_{max}^{0.1N\ NaOH}$ 371 m$\mu$, $\epsilon$=12,000.

EXAMPLE 36

Preparation of 1-(2-nitro-1-imidazolyl)-3-(3-iodo-2-propynyloxy)-2-propanol

To a cooled solution of 15.0 g. (372 mmoles) of sodium hydroxide in 150 ml. of distilled water was added 50.8 g. (279 mmoles) of 3-iodopropargyl alcohol plus 28.0 ml. (358 mmoles) of epichlorohydrin and the mixture was stirred at room temperature for 18 hrs. The layers were separated and the lower organic layer was warmed in vacuo (0.3 mm., bath 60°) to remove water and epichlorohydrin. The 1,2-epoxy-3-(3-iodo-2-propynyloxy)propane product so obtained was dried over Drierite and used without further purification.

A mixture of 7.01 g. (62.0 mmoles) of ground and sieved sublimed 2-nitroimidazole, 0.69 g. of anhydrous potassium carbonate, 48.6 g. of 1,2-epoxy-3-(3-iodo-2-propynyloxy)propane (prepared as described hereinabove) and 100 ml. of absolute ethanol was stirred and refluxed for 1 hour. The hot solution was filtered and the filtrate was allowed to evaporate to give an oil which was repeatedly dissolved in ethanol and the ethanol allowed to evaporate until the oil partially solidified. The mixture was slurried with 40 ml. of ethanol and the solid was filtered, washed with ethanol and dried, m.p. 99.5°–103°. This was recrystallized twice from 5 parts of ethanol to give 1-(2-nitro-1-imidazolyl)-3-(3-iodo-2-propynyloxy)-2-propanol as crystals, m.p. 103°–104°. $\lambda_{max}^{iPrOH}$ 315 m$\mu$, $\epsilon$=7200.

EXAMPLE 37

Preparation of 1-(2-nitro-1-imidazolyl)-3-methoxy-2-propanol

A mixture of 1.00 g. (8.85 mmoles) of sublimed 2-nitroimidazole and 10 ml. of 1,2-epoxy-3-methoxy-propane was refluxed with stirring for 1.5 hrs. During this time the ultraviolet absorption maximum of the reaction mixture in 0.1N NaOH shifted from 374 m$\mu$ to 326 m$\mu$. The excess 1,2-epoxy-3-methoxy-propane was removed in vacuo and the moist solid residue was recrystallized from 10 ml. of boiling ethanol to give 1-(2-nitro-1-imidazolyl)-3-methoxy-2-propanol as crystals, m.p. 108.5°–110.5° having an I.R. spectrum identical to that of the 1-(2-nitro-1-imidazolyl)-3-methoxy-2-propanol prepared using potassium carbonate in the reaction mixture.

EXAMPLE 38

This example illustrates typical pharmaceutical formulations incorporating as active ingredient the novel compounds of this invention.

Capsule Formulation

|  | Per Capsule |
| --- | --- |
| Compound of formula I, II or III | 25 mg. |
| Lactose | 143 mg. |
| Corn Starch | 37 mg. |
| Talc | 5 mg. |
| Total weight | 210 mg. |

PROCEDURE

1. The compound of formula I, II or III, lactose and corn starch were mixed in a suitable mixer.
2. The mixture was further blended by passing through a Fitzpatrick Comminuting Machine with a No. 1A screen with knives forward.
3. The blended powder was returned to the mixer, the talc added and blended thoroughly. The mixture was filled into No. 4 hard shell gelatin capsules on a capsulating machine.

Tablet Formulation

|  | Per Tablet |
| --- | --- |
| Compound of formula I, II or III | 25.0 mg. |
| Lactose | 93.5 mg. |
| Corn Starch | 70.5 mg. |
| Pregelatinized corn starch | 8.0 mg. |
| Calcium stearate | 3.0 mg. |
| Total weight | 200.0 mg. |

PROCEDURE

1. The compound of formula I, II or III, lactose, corn starch and pregelatinized corn starch were mixed in a suitable size mixer.
2. The mix was passed through a Fitzpatrick Comminuting machine fitted with No. 1A screen and with knives forward.
3. The mix was then returned to the mixer and moistened with water to a thick paste. The moist mass was passed through a No. 12 screen and the moist granules were dried on paper lined trays at 110° F.
4. The dried granules were returned to the mixer, the calcium stearate was added and mixed well.
5. The granules were compressed at a tablet weight of 200 mg. using standard concave punches having a diameter of five-sixteenths inch.

Parenteral Formulation

|  | Per cc. |
| --- | --- |
| Compound of formula I, II or III | 5.1 mg. |
| Propylene glycol | 0.4 cc. |
| Benzyl alcohol (benzaldehyde free) | 0.015 cc. |
| Ethanol (anhydrous) | 0.10 cc. |
| Sodium benzoate | 48.8 mg. |
| Benzoic acid | 1.2 mg. |
| Water for injection q.s. | 1.0 cc. |

PROCEDURE (FOR 10,000 CC.)

1. The 51 gms. of the compound of formula I, II or III were dissolved in 150 cc. of benzyl alcohol; 4,000 cc. of propylene glycol and 1,000 cc. of ethanol were added.
2. The 12 gms. of benzoic acid were dissolved in the above. The 488 gms. of sodium benzoate dissolved in 3,000 cc. of water for injection were added. The solution was brought up to final volume of 10,000 cc. with water for injection.
3. The solution was filtered through an 02 Selas candle, filled into suitable size ampuls, gassed with $N_2$ and sealed. It was then autoclaved at 10 p.s.i. for 30 minutes.

Suppository Formulation

|  | Per 1.3 Gm. Suppository |
| --- | --- |
| Compound of formula I, II or III | 0.010 gm. |
| Refined synthetic cocoa butter-coconut derived | 1.245 gm. |
| Carnauba wax | 0.045 gm. |

PROCEDURE

1. The cocoa butter and the carnauba wax were melted in a suitable size glass lined container, mixed well and cooled to 45°C.
2. The compound of formula I, II or III, which had been reduced to a fine powder with no lumps, was added and stirred until completely and uniformly dispersed.
3. The mixture was poured into suppository molds to yield suppositories having an individual weight of 1.3 gms.
4. The suppositories were removed from molds and cooled. They were individually wrapped in wax paper for packaging.

Topical Cream

|  | Per 100 Gms. Cream |
| --- | --- |
| Compound of formula I, II or III | 5.1 gm. |
| Stearic acid | 15.0 gm. |
| Mineral oil light | 1.5 gm. |
| Sorbitan monostearate | 2.5 gm. |

| | |
|---|---|
| Methyl p-hydroxybenzoate | 0.08 gm. |
| Propyl p-hydroxybenzoate | 0.02 gm. |
| Sorbital solution N.F. | 5.00 gm. |
| Polyoxyethylene sorbitan monostearate | 1.69 gm. |
| Distilled water | 72.5 gm. |

PROCEDURE

1. The stearic acid, mineral oil, sorbitan monostearate and methyl and propyl p-hydroxybenzoates were melted together at approximately 75° C. in a suitable size stainless steel, jacketed kettle with agitator.

2. A suspension of the compound of formula I, II or III in a solution of polyoxethylene sorbitan monostearate, sorbitol N.F. and distilled water was added to the melted mixture.

3. The mixture was stirred at 75° C. until uniform and the temperature was gradually reduced with continuous stirring.

4. When the temperature reached 48° C., the cream was transferred to storage containers.

5. The cream was packaged in wax line, tin tubes (opal glass jars may also be used).

We claim:

1. 1,2-epoxy-3-(3-iodo-2-propynyloxy)propane.

* * * * *